(12) United States Patent
Westergaard

(10) Patent No.: US 10,161,388 B2
(45) Date of Patent: Dec. 25, 2018

(54) WIND TURBINE BLADE LIFTING DEVICE AND A METHOD FOR LIFTING A WIND TURBINE BLADE

(71) Applicant: Envision Energy (Denmark) ApS, Silkeborg (DK)

(72) Inventor: Jan Westergaard, Brande (DK)

(73) Assignee: Envision Energy (Demmark) ApS, Silkeborg (DK)

( * ) Notice: Subject to any disclaimer, the term of this patent is extended or adjusted under 35 U.S.C. 154(b) by 598 days.

(21) Appl. No.: 14/728,009

(22) Filed: Jun. 2, 2015

(65) Prior Publication Data

US 2015/0345465 A1    Dec. 3, 2015

(30) Foreign Application Priority Data

Jun. 3, 2014 (DK) .................................. 2014 70320

(51) Int. Cl.
*B66C 1/10* (2006.01)
*F03D 13/10* (2016.01)
*F03D 13/40* (2016.01)

(52) U.S. Cl.
CPC .............. *F03D 13/10* (2016.05); *B66C 1/108* (2013.01); *F03D 13/40* (2016.05); *F05B 2230/61* (2013.01); *Y02E 10/72* (2013.01); *Y02P 70/523* (2015.11); *Y10T 29/49323* (2015.01)

(58) Field of Classification Search
CPC ......... B66C 1/108; F03D 13/10; F03D 13/40; Y10T 29/49323; Y02P 70/523; F05B 2230/61; Y02E 10/72

USPC ........................... 294/67.21, 67.5, 81.3, 81.4
See application file for complete search history.

(56) References Cited

U.S. PATENT DOCUMENTS

| 4,818,004 | A | * | 4/1989 | Oswalt | B66C 1/10 |
| | | | | | 294/67.21 |
| 4,973,094 | A | * | 11/1990 | Tana | B66C 1/28 |
| | | | | | 114/44 |
| 6,048,012 | A | * | 4/2000 | Selby | B66C 1/105 |
| | | | | | 294/67.5 |
| 7,726,941 | B2 | | 6/2010 | Bervang | |
| 8,360,398 | B2 | * | 1/2013 | Diaz De Corcuera | ........ |
| | | | | | B66C 1/108 |
| | | | | | 254/131 |
| 8,567,833 | B2 | * | 10/2013 | Maj | B66C 1/108 |
| | | | | | 294/67.1 |
| 2007/0266538 | A1 | | 11/2007 | Bervang | |

(Continued)

FOREIGN PATENT DOCUMENTS

CA     2848822 A1 *  4/2013  ............. B66C 1/108
CN     102530711 A     7/2012

(Continued)

*Primary Examiner* — Dean J Kramer
(74) *Attorney, Agent, or Firm* — James Creighton Wray; Meera P. Narasimhan

(57) ABSTRACT

A wind turbine blade lifting device having a length, a width and a height and is suitable for lifting and handling a wind turbine blade or a part of a wind turbine blade, also having a length, a width and a height, where the lifting device has a chassis with at least one set of connection for coupling to a lifting apparatus, and a mechanism for engaging a wind turbine blade or blade part. Also, a method for installing at least a part of a wind turbine blade, e.g. a full wind turbine blade or an inner blade part for a partial pitch wind turbine blade having an inner blade part and an outer blade part.

9 Claims, 6 Drawing Sheets

(56) References Cited

U.S. PATENT DOCUMENTS

| | | | |
|---|---|---|---|
| 2009/0324380 A1* | 12/2009 | Pedersen | F03D 1/001 414/800 |
| 2010/0018055 A1* | 1/2010 | Lynderup | B66C 1/108 29/889 |
| 2011/0185571 A1* | 8/2011 | Maj | B66C 1/108 29/889 |
| 2011/0221215 A1* | 9/2011 | Botwright | B66C 1/108 294/81.4 |
| 2013/0093201 A1* | 4/2013 | Li | B66C 1/10 294/81.4 |

FOREIGN PATENT DOCUMENTS

| | | |
|---|---|---|
| CN | 102951548 A | 3/2013 |
| CN | 103738840 A | 4/2014 |
| EP | 2 364 949 A1 | 9/2011 |
| EP | 2 589 795 A1 | 5/2013 |
| EP | 2 604 850 A1 | 6/2013 |
| EP | 2873641 A | 5/2015 |
| KR | 10-1338407 B1 | 12/2013 |
| KR | 101338407 B1 | 12/2013 |
| WO | 2008122448 A1 | 10/2008 |
| WO | 2012062352 A1 | 5/2012 |
| WO | 2014/076826 A1 | 5/2014 |

\* cited by examiner

WIND TURBINE BLADE LIFTING DEVICE AND A METHOD FOR LIFTING A WIND TURBINE BLADE

BACKGROUND OF THE INVENTION

Field of the Invention

The present invention relates to a wind turbine blade lifting device having a length, a width and a height, where said lifting device is suitable for lifting and handling a wind turbine blade or a part of a wind turbine blade, also having a length, a width and a height, where the lifting device comprises a chassis, where said chassis comprises at least one set of connection means for coupling to a lifting apparatus, and where said chassis further comprises means for engaging a wind turbine blade or a blade part.

Description of Related Art

The invention further relates to a method for installing at least a part of a wind turbine blade, e.g., a full wind turbine blade or an inner blade part for a partial pitch wind turbine blade comprising an inner blade part and an outer blade part.

DESCRIPTION OF RELATED ART

It is well known that blades and parts of blades for modern wind turbines have to be handled during production, transport and installation, and as such, blades can easily have a length of 60 to 80 meters—or, in the near future, even longer—and a weight of at least, e.g., 18 metric ton or more. The diameter at the root end of a typical wind turbine blade will typically be 2.5 to 3.5 meters or even more, and therefore, handling such large heavy components can be quite a challenge.

Most of the wind turbines in production are so-called pitch controlled or active stall controlled. The blade for such wind turbines is installed at some kind of bearing at the hub and via said bearing it is possible to rotate the blade about a central axis of the flange at the hub. When a wind turbine blade has to be installed at the hub, the blade will typically be hoisted in a horizontal position, positioned and installed at said hub. Such an operation will be performed by using two cranes which is rather expensive, and it is also demanding for the persons operating the two cranes as one operator's action may cause the other operator serious problems. The operators installing rotor blades, e.g., offshore and in rather harsh conditions, need to rely 100% on each other, and still installation and handling of rotor blades or parts thereof are challenging.

During the recent years, partial pitch blades have been introduced to the market. Partial pitch blades comprise an inner blade part and an outer blade part, where a pitch bearing is arranged between said two blade parts. Such a partial pitch blade will typically be divided between ⅓ and ½ of the length when measured from the root end of the blade and towards the tip end. The inner blade part is designed as a rigid component that is suitable for having a pitch bearing installed at the interface towards the outer blade part. When installing the complete blade, or the inner blade part, or the outer blade part to the inner blade part, the same method as discussed above can be used, but still the components are rather large and heavy and need to be handled with care and precision and with two cranes in order to control the position of the blade or blade part in a sufficient manner.

Korean Patent Application 101338407 B1 discloses a blade lifting device comprising a top frame structure on which a slidable lifting lug is arranged. Two actuator systems are arranged on either side of the lifting lug for adjusting the position of the lifting lug. The actuators and sliding means of the lifting lug need to be dimensioned to handle the total mass of the lifting device and the blade, this increases the amount of force needed to move the lifting lug as the total mass exceeds several metric tons.

U.S. Patent Application Publication 2007/0266538 A1 and corresponding U.S. Pat. No. 7,726,941 B2 disclose a blade lifting device comprising a frame structure to which a lifting arm is connected. Said lifting arm comprises two arm elements and a transverse weight element connected to the two arm elements. The weight element has a weight of 1 to 5 tons. The lifting arm can be folded into a transport position via a hinge, however the position of the weight element is not moved during the lifting process.

No matter which type of blades is used, they need to be installed at the rotor hub, and preferably after the hub has been installed at the nacelle. Also ground handling of the blades is rather important as production and handling is a constant subject of optimization in order to produce blades more efficiently and at a lower cost.

SUMMARY OF THE INVENTION

It is an object of the invention to provide a device as well as a method for lifting, handling and/or for installation of a blade or a blade part for a wind turbine, where a blade or blade part comprises a first end and a second end, and where a blade or blade part, e.g., a blade or blade part produced as a typical wind turbine blade, comprises an airfoil shaped cross section, where lifting and handling can be performed without having to attach lifting equipment such as chains and slings to parts of the blade or blade parts, as these parts may have a somewhat fragile nature.

It is a further object of the invention to provide an easy way to install and to use a solution for lifting, handling and/or for installation of a blade or a blade part for a wind turbine, where the object being lifted or handled can be controlled in a precise manner.

As mentioned above, the invention relates to a wind turbine blade lifting device having a length, a width and a height, where said lifting device is suitable for lifting and handling of a wind turbine blade or a part of a wind turbine blade, also having a length, a width and a height, where the lifting device comprises a chassis, where said chassis comprises at least one set of connection means for coupling to a lifting apparatus, and where said chassis further comprises means for engaging the wind turbine blade or the part of a wind turbine blade.

The lifting device further comprises means for adjusting the point of gravity of at least the lifting device by at least one of the following parameters:
  adjusting the weight of at least one weight element,
  adjusting the position of at least one weight element in the length direction of the chassis;
  adjusting the position of at least one weight element in the width direction of the chassis.

The connection means, where, e.g., a wire sling or a crane hook is connected, can be adjusted manually or by a suitable type of actuator in order to change the point of gravity of the lifting device including a wind turbine blade or a part of a wind turbine blade. By changing the point of gravity, it becomes possible to lift the object in a straight and steady lift after having performed an adjustment or even during adjustment of the point of gravity. By using the already known products designed to lift wind turbine blades, it demands that the lifting equipment is arranged very precisely at a wind turbine blade or a part of a wind turbine blade (the object). If the lifting equipment is installed at a wind turbine blade in a position where the system is not in balance, it will, in some cases, be necessary to loosen the equipment and to move it a certain distance based on "feelings and experience" before a balanced lift can take place. A very precise balance is needed as a wind turbine blade or a part of a wind turbine blade easily can be damaged if an unbalanced lift accidently causes the wind turbine blade or the part of a wind turbine blade to touch the ground or other objects during the initial lift from the ground, from the deck of a ship or from a flatbed trailer. Also during installation of a wind turbine blade at a hub, e.g., 80 meters above the ground, the balance is very important and might need adjustment in order to bring the blade into the perfect position for the bolts to be fitted in the boltholes.

Adjustment of the point of gravity can be performed in several ways, e.g., by having one or more weight elements that can also be adjusted manually in the length and/or the width direction of the lifting device or the weight elements can be positioned by operating one or more actuators.

In an embodiment of a wind turbine blade lifting device, the lifting device further comprises means for adjusting the point of gravity of at least the lifting device by adjusting the position of the at least one set of connection means.

Also the connection means at the lifting device can be moved into alternative position/positions in order to move the lifting point in relation to the point of gravity. Any movement of connection means or weights can be done manually or by use of actuators or other kinds of mechanical means.

In an embodiment of a wind turbine blade lifting device according to the invention, the lifting device may comprise one or more load cells arranged between the chassis and the connection means. This way any uneven loads in the complete lifting device and the object arranged in it can be detected and the balance can be adjusted accordingly in order to either adjust the lifting point or the weight distribution of the complete lift. As mentioned above, one or more load cells can be used to generate input for adjusting the specific lift, but adjustment of the lifting point or of the point of gravity can also be based on visual inspection followed by manually or semiautomatic operating adjustment means as mentioned above.

In an embodiment of a wind turbine blade lifting device according to the invention, the lifting device comprises actuator means, e.g., a hydraulic actuator, where said actuator means are arranged between the chassis of the lifting device and the connection means. The connection means can be arranged via a pivot joint at the chassis, where a hydraulic actuator is arranged to pivot said connection means, e.g., an arm, about said pivot joint and, thus, to change the point of gravity of the lifting device and any object arranged in the lifting device. This is a rather simple solution and a lifting device according to the invention may comprise only one set of such movable or pivotable connection means, but two, three, four or even more adjustable lifting points may also be present. Each of such lifting points may be individually or common adjustable.

In one embodiment of a wind turbine blade lifting device according to the invention, the chassis of the lifting device may comprise a track arrangement, where at least one weight element is arranged moveably/slideably along said track arrangement. By moving the weight element, the point of gravity will be changed and the complete lift will be balanced. Such a weight can, e.g., have a weight of 50 to 500 kilograms or even more depending on specific needs. The main issue is that the weight is heavy enough to actually adjust the point of gravity in a manner that allows a lift to take place in optimum balance and in a desired position.

An embodiment of a wind turbine blade lifting device according to the invention may have a chassis comprising a top structure, a side structure and a bottom structure, where the chassis comprises an open side opposite said side structure. The lifting device thus forms a C-shape, where said lifting device can have a length of, e.g., 10 meters, a width of, e.g., 3 meters and a height of, e.g., 6.5 meters. The overall weight of such a lifting device can be between 5.000 and 18.000 kilograms or even more. The mentioned measures are only to be seen as examples as they of cause can be lower and also higher. A lifting device having a C-shaped frame allows a wind turbine blade or blade part to be arranged in it by placing the lifting device along the side of a blade and then bringing the bottom structure in position under the blade or blade part. This is an easy way and also a fast way of coupling the blade—the object—to the lifting device.

A wind turbine blade lifting device according to the invention may have a side structure that comprises blade surface support pads. The support pads may be counter shaped support pads that fit the surface of the blade or blade part, at least to some extent, and the support pads may preferably be manufactures from an elastomer which allows some deformation, but still has the capability of carrying the actual loads without the object being damaged.

Furthermore, a wind turbine blade lifting device according to the invention may also comprise blade surface support pads at the bottom structure. Also these support pads may be counter shaped support pads, and the support pads may be exchangeable in order to fit specific blade types.

In an embodiment of a wind turbine blade lifting device according to the invention, said chassis comprises at least one adjustable locking arm, where said at least one locking arm, at a first end, is arranged at the chassis and, at a second end, comprises means for supporting the wind turbine blade or the part of a wind turbine blade. Such a locking arm arranged at the chassis will support and hold the blade or blade part in the lifting device and may be operated manually, electrically, pneumatically or hydraulically by wire or wireless communication. In a preferred embodiment there will be two locking arms along the length of the chassis, and there might even be arranged two sets of locking arms, where a set comprises two locking arms, e.g., one on the pressure side and one on the suction side of the wind turbine blade or blade part. In the following drawings an example hereof will be seen.

A wind turbine blade lifting device according to the invention may be arranged with a chassis, where said chassis comprises a power pack, e.g., where said power pack comprises at least one of: accumulated hydraulic energy, pneumatic energy, electric energy, or a combustion engine. Such a power pack may be remote operated by wire or wireless communication with a control panel. One function of the power pack is to change the point of gravity of the lifting device with or without a blade or blade part. As mentioned above, the point of gravity can be changed by moving a weight via tracks or by pumping a liquid from one container to another container or by moving one or more connection means at the chassis of the lifting device. No matter which solution is used for changing the point of gravity, it can be done by operating the power pack and via that operate means for performing one or more of the mentioned solutions.

In yet an embodiment of a wind turbine blade lifting device according to the invention, said chassis may comprise height adjustment means at the side structure, where said height adjustment means allows for adjusting the height of the chassis. This will allow the lifting device to be adjusted according to different sizes of blade or blade parts as e.g., the position of the locking arms is very important in order to support and hold the blade or blade part in a safe and secure manner. Such an adjustment of height can be done by unbolting the side structure and installing a spacer or by exchanging the lower part of the side structure. Also a telescopic solution may be used at the side structure in order to adjust the height into a variety of positions.

A wind turbine blade lifting device according to the invention may also have a chassis, where the chassis comprises length adjustment means, e.g., at the top or side structure, where said length adjustment means allows for adjusting the length of the chassis. Such an adjustment may be performed in order to make the lifting device fit to blades or blade parts of different dimensions. Adjustment of height as well as length can be done manually or even automatically by operating mechanical actuators e.g., by power from a power pack at the lifting device or by power from an external power source.

The invention also comprises a method for installing at least a part of a wind turbine blade, e.g., a full wind turbine blade or an inner blade part for a partial pitch wind turbine blade comprising an inner blade part and an outer blade part.

Said method further comprises at least the following steps:
  arranging at least a part of a wind turbine blade in a wind turbine blade lifting device,
  fixating the at least a part of a wind turbine blade in the wind turbine blade lifting device,
  adjusting the balance of said at least a part of a wind turbine blade and the wind turbine blade lifting device by adjusting the point of gravity by adjusting one of the following parameters: the weight of at least one weight element, the position of at least one weight element, in at least one of the length and width direction of the wind turbine lifting device,
  performing and terminating the installation.

As mentioned, the balance of a lifting device including a blade or blade part can be adjusted by changing the point of gravity, and thus, e.g., a mounting flange at a wind turbine blade can be positioned very precisely in relation to a corresponding mounting surface at a wind turbine hub, which will allow for a more easy installation with less risk of damage to the parts as well as to the people performing the installation. The point of gravity can be changed by moving either weight elements in relative to a reference point or altering the weight of at least one weight element.

In an embodiment of a method according to the invention, said step of adjusting the balance of the at least a part of a wind turbine blade and the wind turbine blade lifting device further comprises adjusting the position of at least one set of connection means.

Also, the point of gravity can be changed by moving the position of one or more connection means for the crane to be connected at.

In an embodiment of a method according to the invention, the method further comprises at least the following steps:
  adjusting the balance of the at least a part of a wind turbine blade and the wind turbine blade lifting device by remote operating of the means for adjusting the point of gravity.

A remote operating by wire or wireless via a control panel is attractive as it becomes possible to adjust the position of a lifting device including a blade or blade part even though it is hoisted, e.g., 80 meters above ground level. Such a remote operation of, e.g., a power pack at the lifting device can be done from ground level, from the crane or from the nacelle or hub of a wind turbine where a blade is to be installed. This means that a person situated in the top of a wind turbine can control and adjust the position of wind turbine blade together with a crane operator in order to install such a blade.

An embodiment of the invention will now be described, by way of example only, with reference to the accompanying drawings.

DETAILED DESCRIPTION OF THE INVENTION

In the following text, the figures will be described one by one and the different parts and positions seen in the figures will be numbered with the same numbers in the different figures. Not all parts and positions indicated in a specific figure will necessarily be discussed together with that figure.

Detailed Description of the Invention

Figure 1:
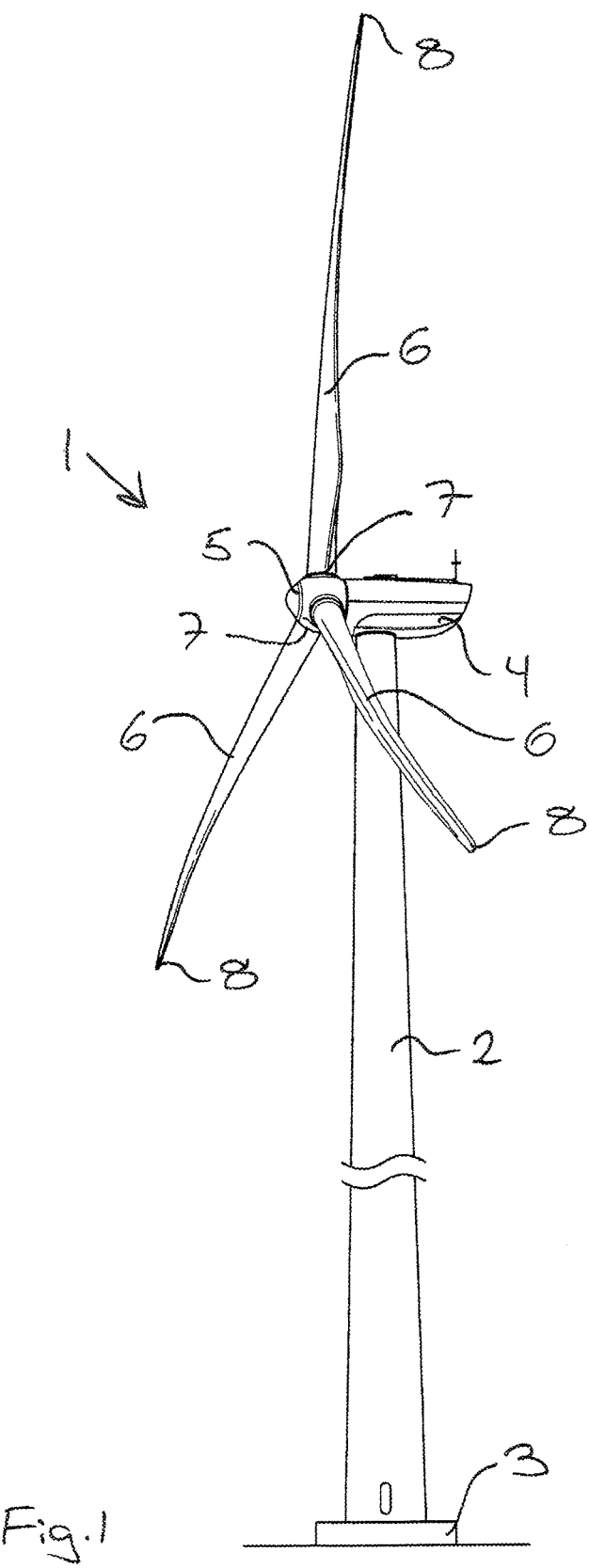
FIG. 1 shows a wind turbine.

In FIG. 1, a typical wind turbine 1 is seen comprising a tower 2 installed at a foundation 3. At the top of the tower 2, a nacelle 4 comprising e.g., a gearbox, a generator and other components is seen, where the mentioned components are covered by a nacelle cover. At the nacelle 4, there is also installed a shaft for carrying a rotor comprising a hub 5 and three wind turbine rotor blades 6. The rotor blades 6 are arranged at the hub 5 at a first end 7 called the root end of the rotor blade 6. The second end 8 of the rotor blades 6 constitutes a tip end.

Figure 2:
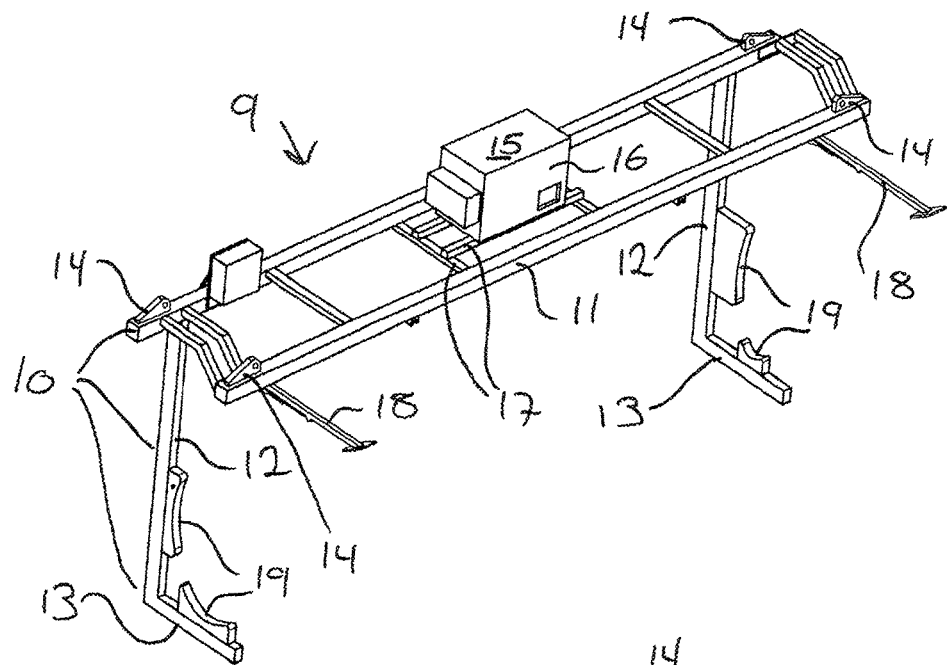
FIG. 2 shows a lifting device for a wind turbine blade or a part of a wind turbine blade.

FIG. 2 shows a lifting device 9 for a wind turbine blade 6 or a part of a wind turbine blade, where the chassis 10 comprises a top structure 11, a side structure 12 and a bottom structure 13. At the top structure 11, four connection means 14 are situated—one at each corner—for a crane to engage. Centrally at the top structure 11, a power pack 15 is seen here also comprising weight elements 16 that can be positioned along a track arrangement 17 in as well the length as the width direction of the lifting device 9. Furthermore, two locking arms 18 are arranged at the top structure 11 and support pads 19 are seen at the side structure 12 and at the bottom structure 13. The support pads 19 are shaped to accommodate certain areas of a wind turbine blade 6.

Figure 3:
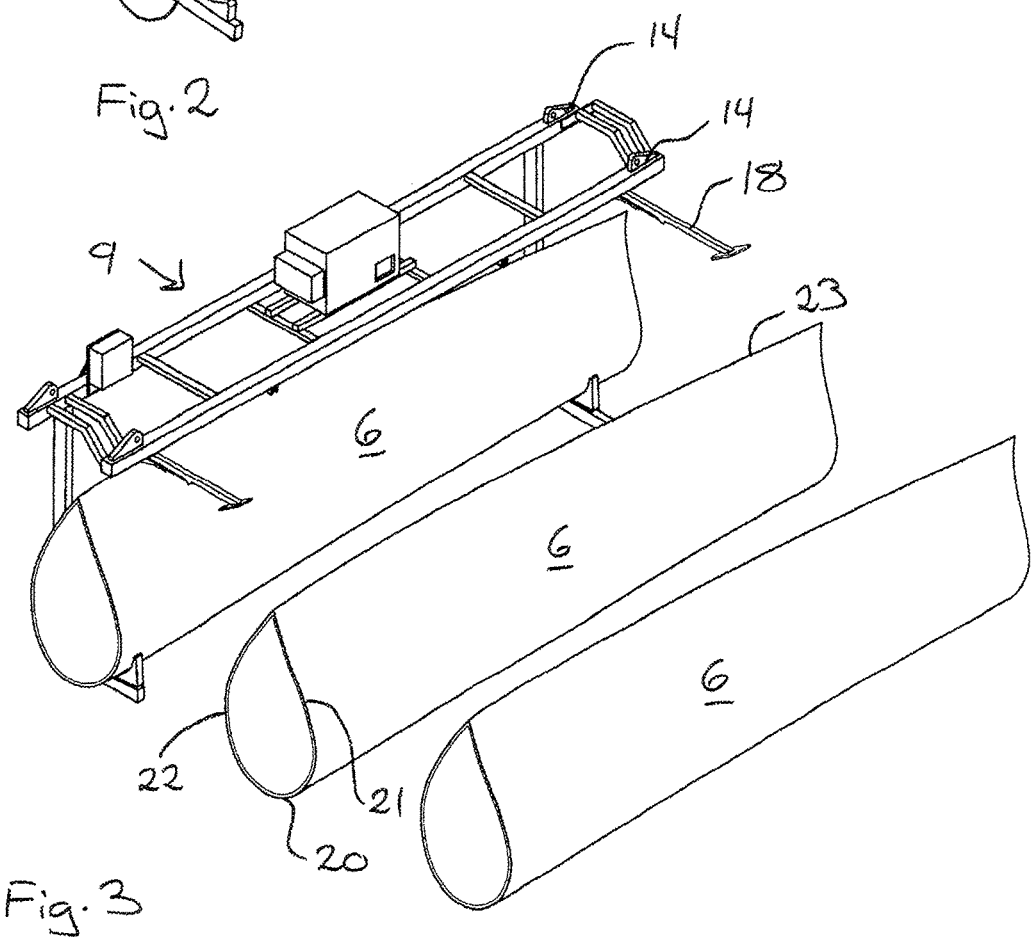
FIG. 3 shows a lifting device engaging a part of a wind turbine blade.

In FIG. 3, a lifting device 9 is seen engaging a part of a wind turbine blade 6, where the leading edge 20 is accommodated in the support pads 19 at the bottom structure 13, and where the locking arms 18 are ready to be engaged in order to hold the suction side 22 against the support pads 19 at the side structure 12 allowing the trailing edge 23 to remain untouched.

Figure 4:
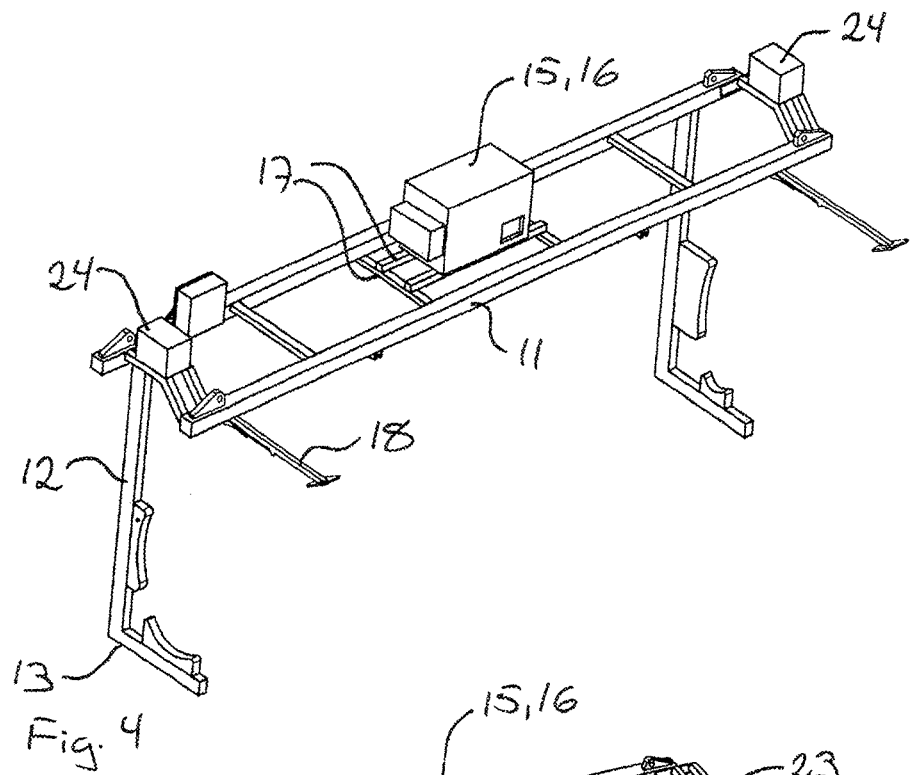
FIG. 4 shows a lifting device with two liquid containers at the top frame.

FIG. 4 also shows a lifting device 9 for a wind turbine blade 6 or a part of a wind turbine blade, where the chassis 10 comprises a top structure 11, a side structure 12 and a bottom structure 13. At the top structure 11, four connection means 14 are situated—one at each corner—for a crane to engage. Centrally at the top structure 11, a power pack 15 is seen here also comprising weight elements 16 that can be positioned along a track arrangement 17 in as well the length as the width direction of the lifting device 9. Furthermore, two containers 24 are seen, where a liquid such as water, oil or any other liquid can be moved from one container 24 to another container 24 in order to change the point of gravity of the lifting device with or without a wind turbine blade or blade part 6. The system for moving liquid from one container 24 to one or more other containers can be used as an individual solution, but it can also be combined with an adjustable weight element 16, where both systems support each other in changing the point of gravity.

Figure 5:
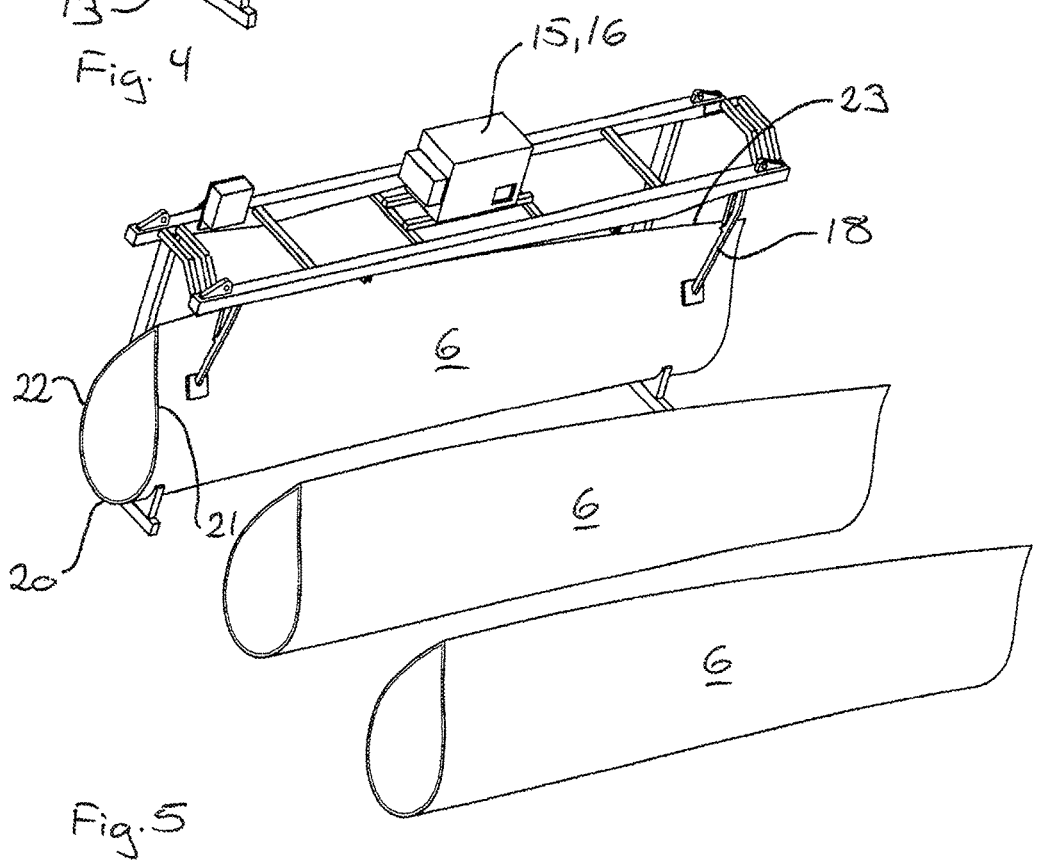
FIG. 5 shows a lifting device holding a part of a wind turbine blade.

In FIG. 5, a lifting device 9 is seen engaging a part of a wind turbine blade 6, where the leading edge 20 is accommodated in the support pads 19 at the bottom structure 13, and where the pressure side 21 is supported by the engaged locking arms 18 holding the suction side 22 against the support pads 19 at the side structure 12 allowing the trailing edge 23 to remain untouched.

Figure 6:
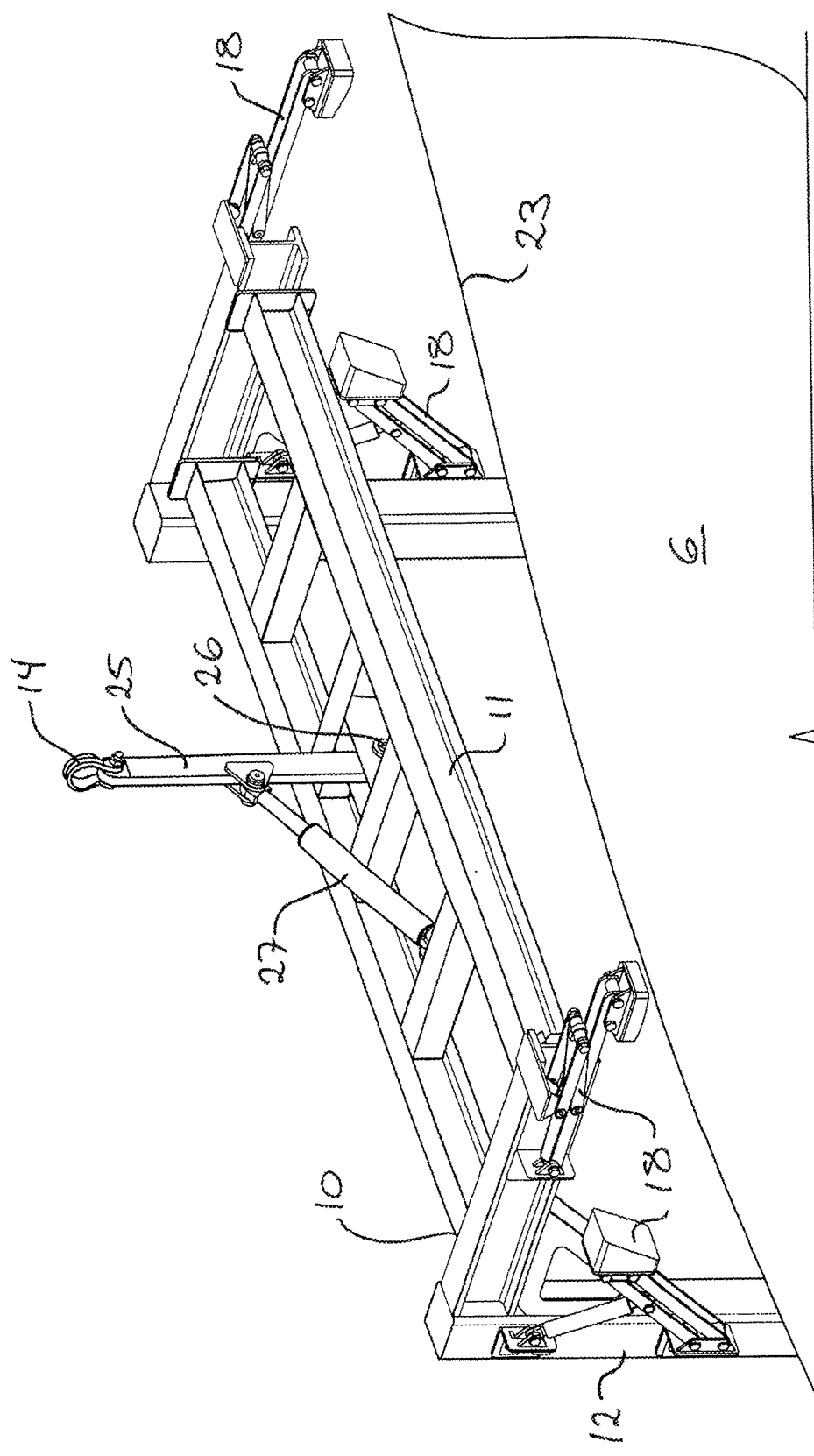
FIG. 6 shows parts of a lifting device comprising adjustable connection means.

FIG. 6 shows parts of a lifting device 9 comprising adjustable connection means 14, where the connection means 14 comprises an arm 25 arranged at the top structure 11 via a pivot joint 26 and is movable via an actuator 27 arranged between the arm 25 and the top structure 11. By extending or retracting the actuator 27, the connection means 14 will move and consequently the point of gravity will change. In this embodiment, the arm is allowed to move in the length direction of the lifting device 6, but could also be arranged to be able to move in the width direction or even in both of the length and width direction of the lifting device 6 in order to have maximum adjustability. The illustrated actuator 27 may be a hydraulic, pneumatic, electrical or any suitable type of actuator and it might be powered by a power pack 15 as seen in FIGS. 2, 3, 4 and 5 at the lifting device 6 or from an external source. In this embodiment, it is further seen that two sets of locking arms 18 are present, where each set comprises two locking arms 18, namely one set at the top structure 11 and one set at the side structure 12—here seen disengaged.

Figure 7:
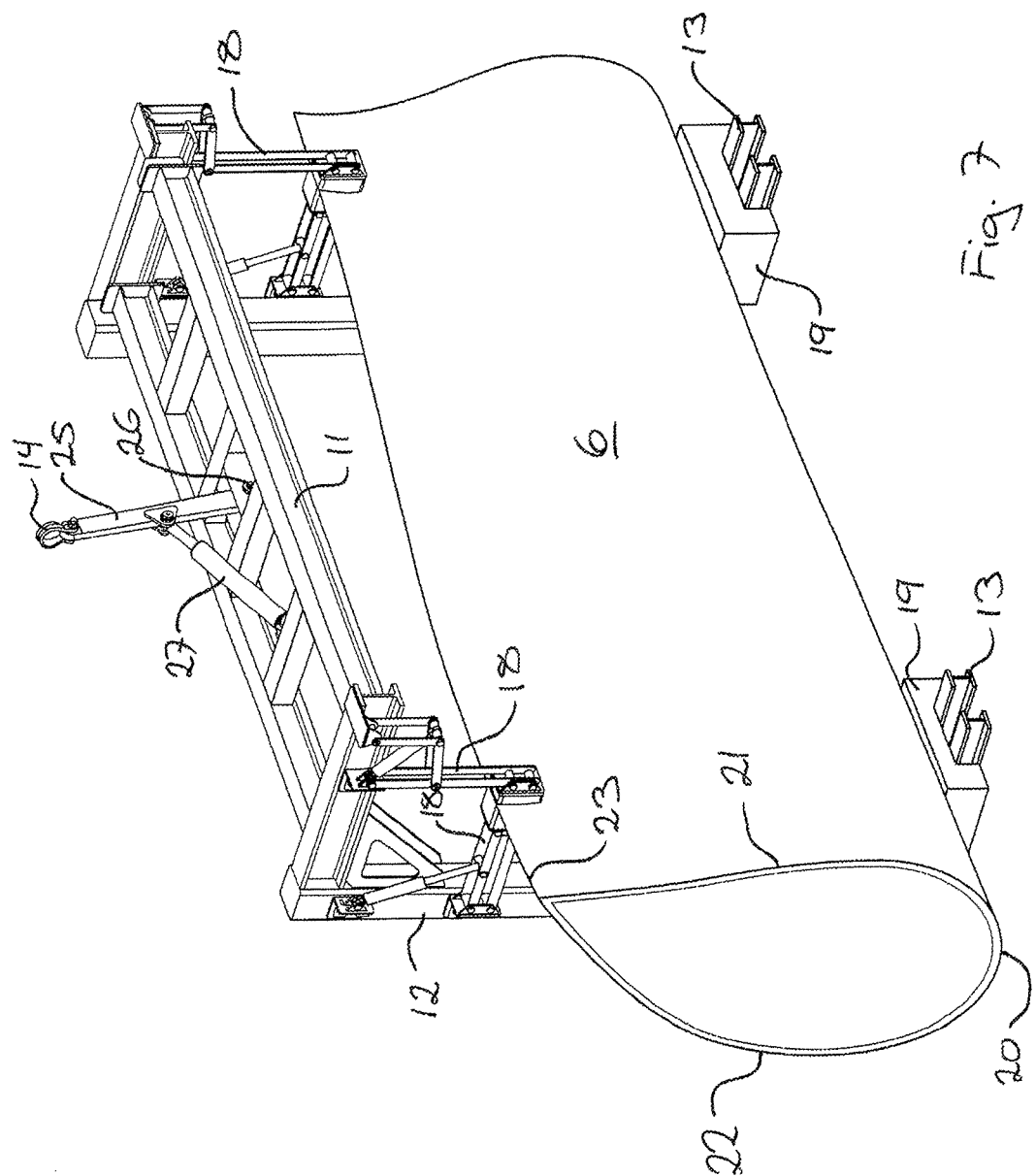
FIG. 7 shows a lifting device comprising adjustable connection means and two individual sets of locking arms, each comprising two locking arms.

FIG. 7 shows a lifting device 9 comprising adjustable connection means 14 and two individual sets of locking arms 18, each comprising two locking arms 18, as also seen in FIG. 6. Here, the locking arms are engaged and the locking arms 18 at the top structure 11 are in contact with the pressure side 21 at the trailing edge 23, and the locking arms 18 at the side structure 12 are in contact with the suction side 22, also at the trailing edge 23.

Figure 8:
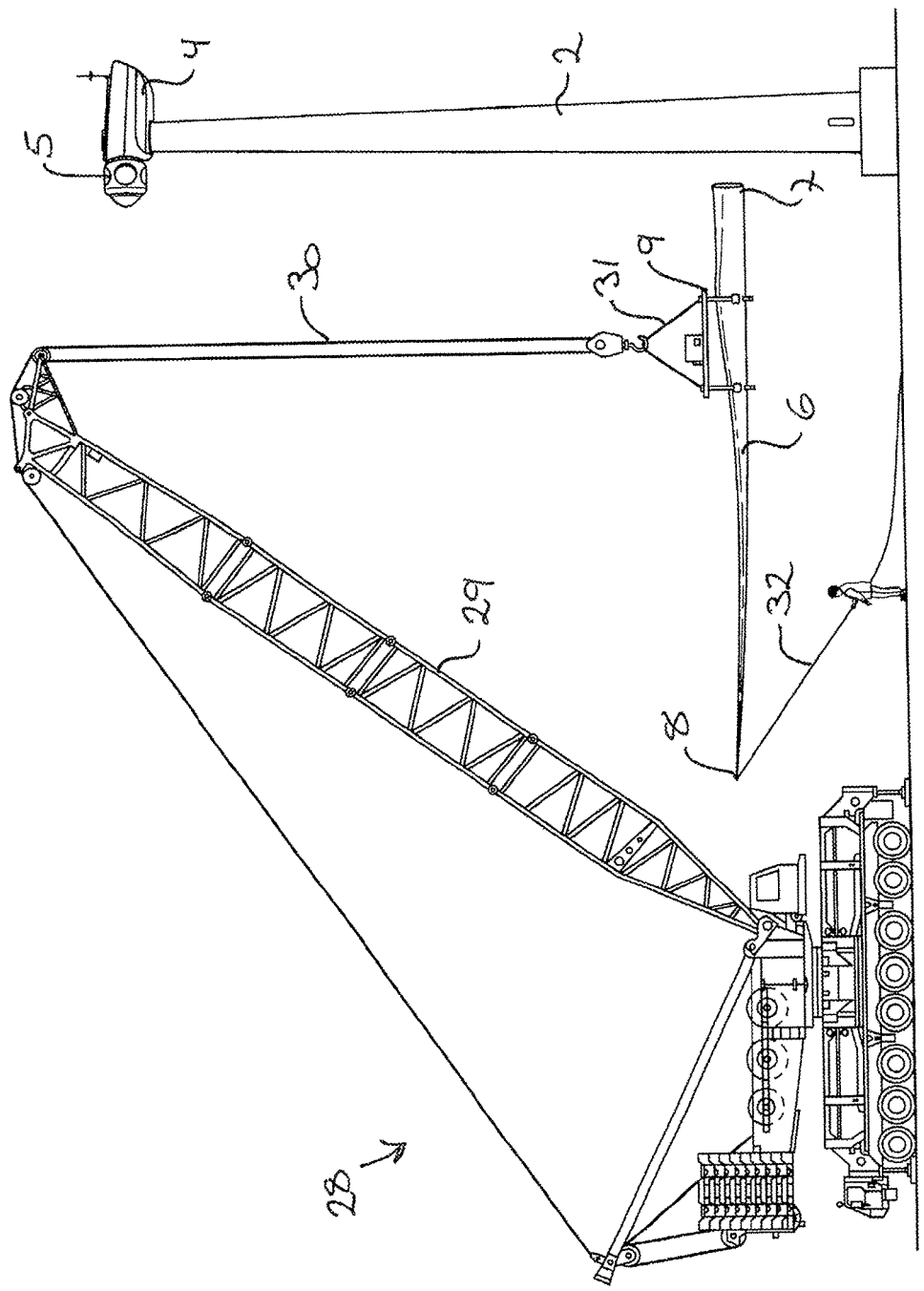
FIG. 8 shows a crane operating a lifting device during installation of a wind turbine blade at a wind turbine.

FIG. 8 shows a crane 28 comprising a crane arm 29 with a wire 30 hooked to a wire sling 31. The wire sling is connected to the connection means 14 at the top structure 11 of the chassis 10. The crane 28 is used to operate a lifting device 9 during installation of a wind turbine blade 6 at a wind turbine 1. The wind turbine blade 6 is controlled at the tip end 8 via a support line 32 held manually.

The invention is not limited to the embodiments described herein, and may be modified or adapted without departing from the scope of the present invention.

What is claimed is:

1. A wind turbine blade lifting device having a length, a width and a height and arranged for arranging and fixating at least a part of a wind turbine blade in said wind turbine blade lifting device for lifting and handling a wind turbine blade or a part of a wind turbine blade that also has a length, a width and a height, where the lifting device comprises:
   a chassis having at least one set of connection means for coupling to a lifting apparatus, and means for engaging the wind turbine blade or the part of a wind turbine blade, said chassis comprising a top structure at which four connection means are situated, one at each corner, and a power pack comprising at least one weight element being provided on said chassis, and
   wherein said lifting device further comprises:
   means for adjusting the point of gravity of at least the lifting device by adjusting at least one of the following parameters:
   the position of said at least one weight element in the length direction of the chassis; and
   the position of said at least one weight element in the width direction of the chassis.

2. A wind turbine blade lifting device according to claim 1, wherein the chassis of the lifting device comprises a track arrangement, where the at least one weight element is arranged movable along said track arrangement.

3. A wind turbine blade lifting device according to claim 1, wherein said chassis further comprises a side structure and a bottom structure, where the chassis comprises an open side opposite said side structure.

4. A wind turbine blade lifting device according to claim 3, wherein said side structure comprises blade surface support pads.

5. A wind turbine blade lifting device according to claim 3, wherein said bottom structure comprises blade surface support pads.

6. A wind turbine blade lifting device according to claim 3, wherein said chassis comprises at least one adjustable locking arm, where said at least one locking arm, at a first end, is arranged at the chassis and, at a second end, comprises means for supporting the wind turbine blade or the part of a wind turbine blade.

7. A wind turbine blade lifting device according to claim 1, wherein said power pack comprises at least one of: accumulated hydraulic energy, pneumatic energy, and electric energy.

8. A method for installing at least a part of a wind turbine blade or part of a wind turbine blade with the wind turbine blade lifting device of claim 1, comprising at least the following steps:
   arranging at least a part of a wind turbine blade in a wind turbine blade lifting device comprising a chassis which has a top structure at which four connection means are situated, one at each corner, and a power pack comprising at least one weight element and being provided on said chassis,
   fixating the at least a part of a wind turbine blade in the wind turbine blade lifting device,
   fixating said wind turbine blade lifting device to a lifting apparatus by engaging the lifting device to said four connection means, adjusting the balance of said at least a part of a wind turbine blade and the wind turbine blade lifting device by adjusting the point of gravity by adjusting one of the following parameters:
the position of at least one weight element, in at least one of the length and width direction of the wind turbine lifting device, and
performing and terminating the installation.

9. A method according to claim 8, wherein the method further comprises at least the following additional step: adjusting the balance of the at least a part of a wind turbine blade and the wind turbine blade lifting device by remote operation of the adjusting the point of gravity.

\* \* \* \* \*